(12) United States Patent
Eysing

(10) Patent No.: US 7,320,503 B2
(45) Date of Patent: Jan. 22, 2008

(54) BACKREST FOR SEATS AND CHAIRS HAVING PRESSURE AND TENSILE ELEMENTS

(75) Inventor: Volker Wilhelm Eysing, Kiel (DE)

(73) Assignees: Volker W. Eysing, Kiel (DE); Provenda Marketing AG, Sennwald (CH)

( * ) Notice: Subject to any disclaimer, the term of this patent is extended or adjusted under 35 U.S.C. 154(b) by 104 days.

(21) Appl. No.: 11/175,028

(22) Filed: Jul. 6, 2005

(65) Prior Publication Data

US 2006/0033369 A1 Feb. 16, 2006

(30) Foreign Application Priority Data

| Jul. 6, 2004 | (DE) | .................... 10 2004 032 765 |
| Dec. 2, 2004 | (DE) | ................ 20 2004 018 712 U |
| Feb. 16, 2005 | (CH) | ................................. 0277/05 |

(51) Int. Cl.
    *A47C 7/02* (2006.01)
(52) U.S. Cl. .......................... 297/452.63; 297/452.15; 297/452.29; 297/440.2; 297/285
(58) Field of Classification Search ........... 297/452.29, 297/452.3, 452.63, 452.15
    See application file for complete search history.

(56) References Cited

U.S. PATENT DOCUMENTS

| 3,298,743 | A | | 1/1967 | Albinson et al. |
| 3,300,251 | A | | 1/1967 | Helms |
| 3,565,482 | A | | 2/1971 | Blodee |
| 4,367,897 | A | * | 1/1983 | Cousins ................... 297/284.3 |
| 4,621,866 | A | * | 11/1986 | Zani ........................ 297/284.3 |
| 5,975,641 | A | * | 11/1999 | Delesie ................. 297/452.63 |
| 6,056,367 | A | * | 5/2000 | Hsiao ..................... 297/452.63 |

(Continued)

FOREIGN PATENT DOCUMENTS

DE  19916411  11/2000

(Continued)

*Primary Examiner*—David Dunn
*Assistant Examiner*—Erika Garrett
(74) *Attorney, Agent, or Firm*—Nixon & Vanderhye P.C.

(57) ABSTRACT

The invention relates to a backrest with a support area (71), at least one structure connected to the support area (71) or forming the support area (71), which structure (10) extends towards the top of the backrest from a first end region of the support area (71) to a second end region of the support area (71) and at the front has a tension element (49) and at the rear a pressure element (47). The tension element (49) connects the first end region (37) of the support area (71) to the second end region (38) of the support area (71) transmitting tensile forces. The pressure element (47) connects the first end region (37) of the support area (71) to the second end region (38) of the support area (71) transmitting thrust forces. Pressure element (47) and tension element (49) are in the extension direction non-displaceably connected to one another in the first and in the second end region of the support area (71). The tension element (49) and the pressure element (47) between the end regions (37, 38) are connected to one another in the extension direction displaceably against each other by means of the spacers (14) keeping the distance. The backrest has at least one bearing axis (43), with which it can be joined or is joined to a seat-back bracket at a distance from the first and from the second end region of the support area (71) between these end regions (37, 38).

46 Claims, 12 Drawing Sheets

U.S. PATENT DOCUMENTS

| | | | |
|---|---|---|---|
| 6,135,562 A * | 10/2000 | Infanti | 297/440.2 |
| 6,709,060 B1 * | 3/2004 | Su | 297/440.2 |
| 6,877,816 B1 * | 4/2005 | Farmont | 297/452.63 |
| 6,880,886 B2 * | 4/2005 | Bodnar et al. | 297/285 |
| 7,097,247 B2 * | 8/2006 | Battey et al. | 297/284.4 |
| 2004/0084951 A1 * | 5/2004 | Pawlush | 297/452.63 |
| 2004/0183348 A1 | 9/2004 | Kniese | |

FOREIGN PATENT DOCUMENTS

| | | |
|---|---|---|
| DE | 10058 017 | 5/2002 |
| EP | A-1040999 | 10/2000 |
| GB | 1 140 157 | 2/1968 |

* cited by examiner

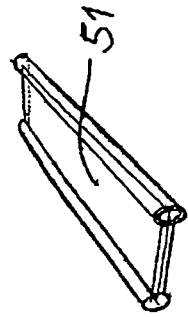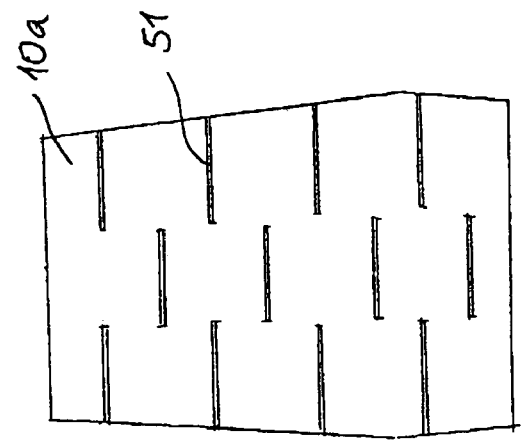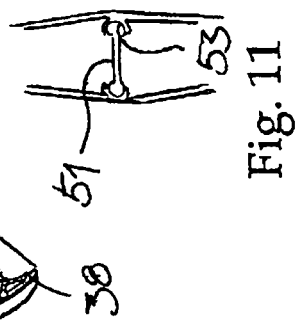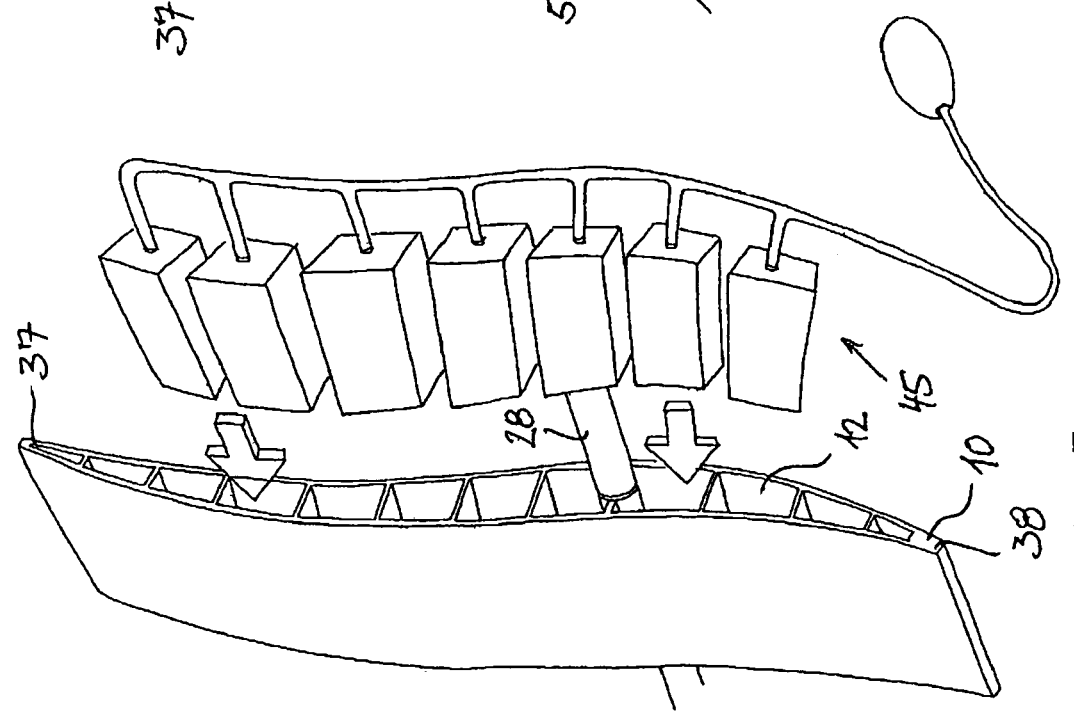

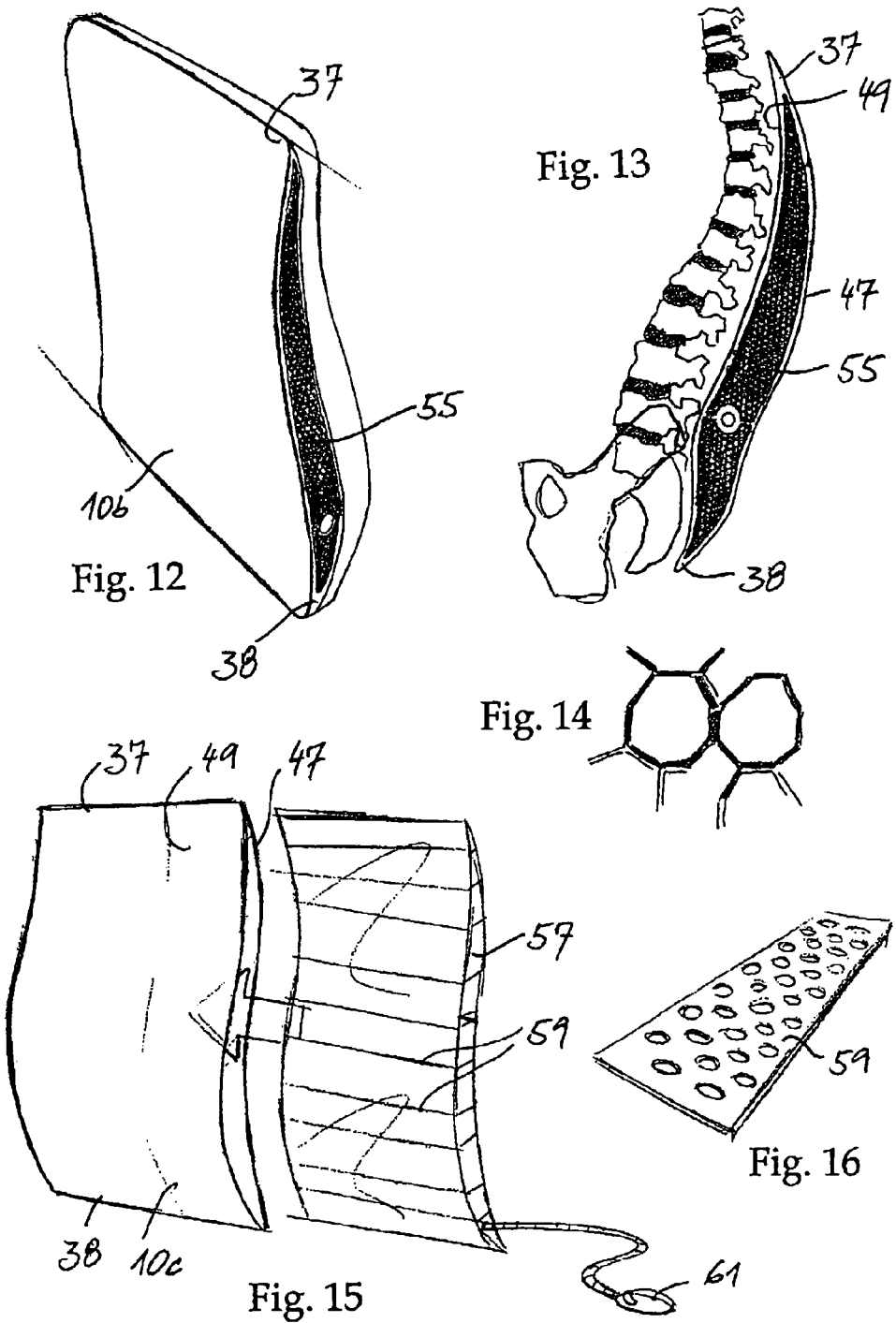

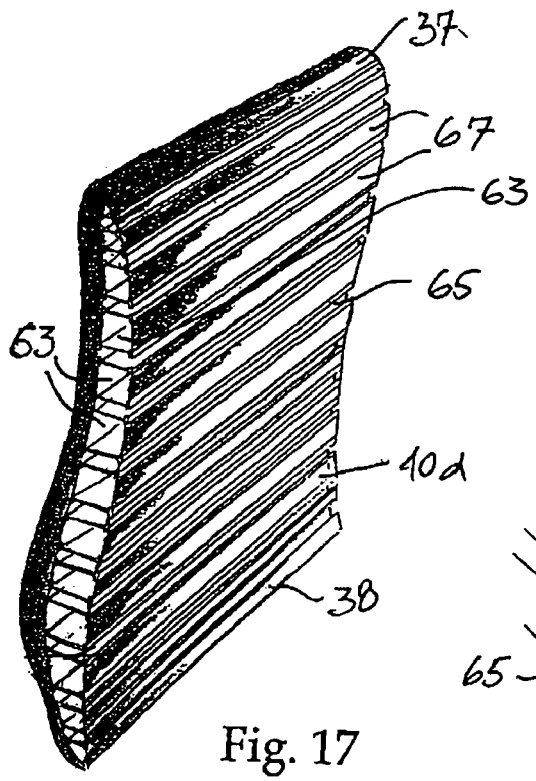
Fig. 17
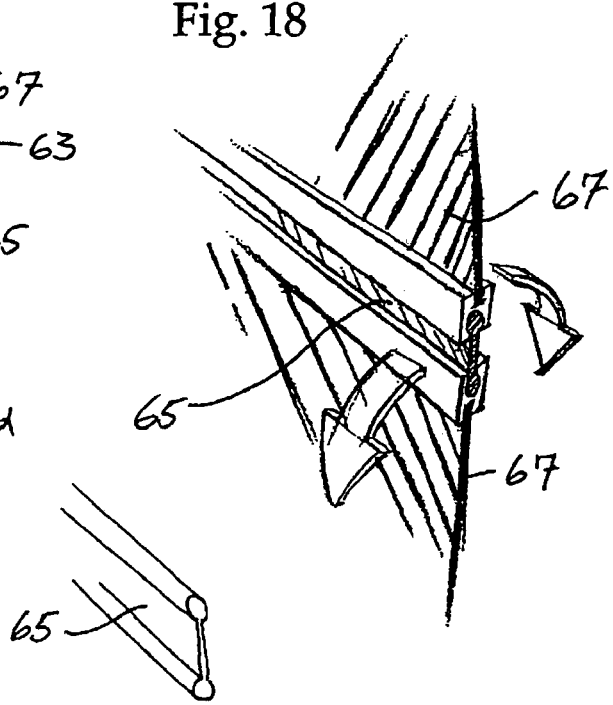
Fig. 18
Fig. 19
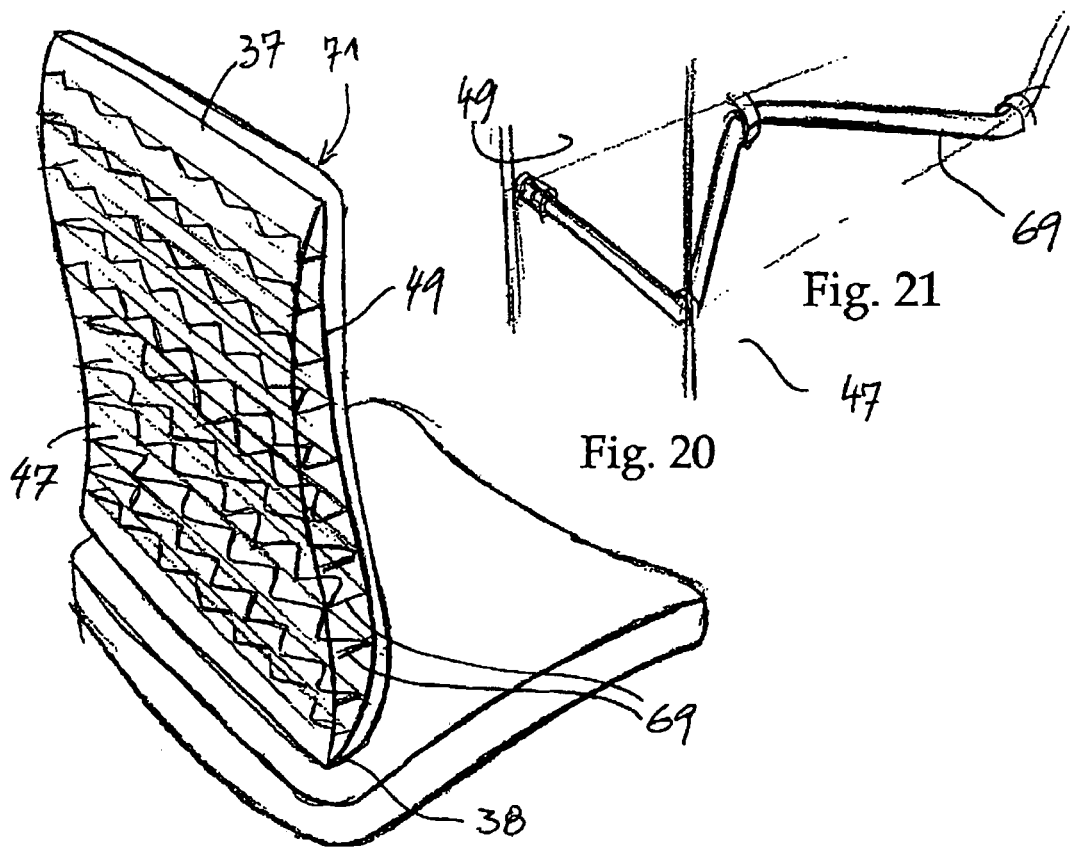
Fig. 20
Fig. 21

Fig. 22
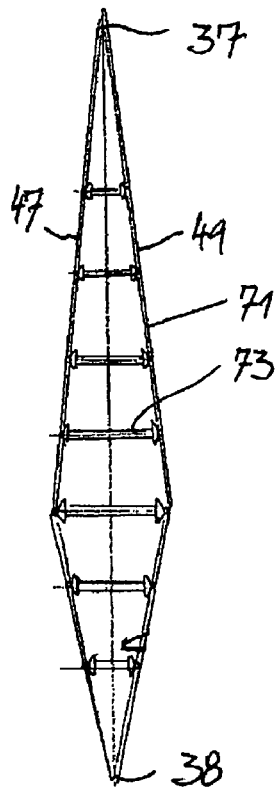
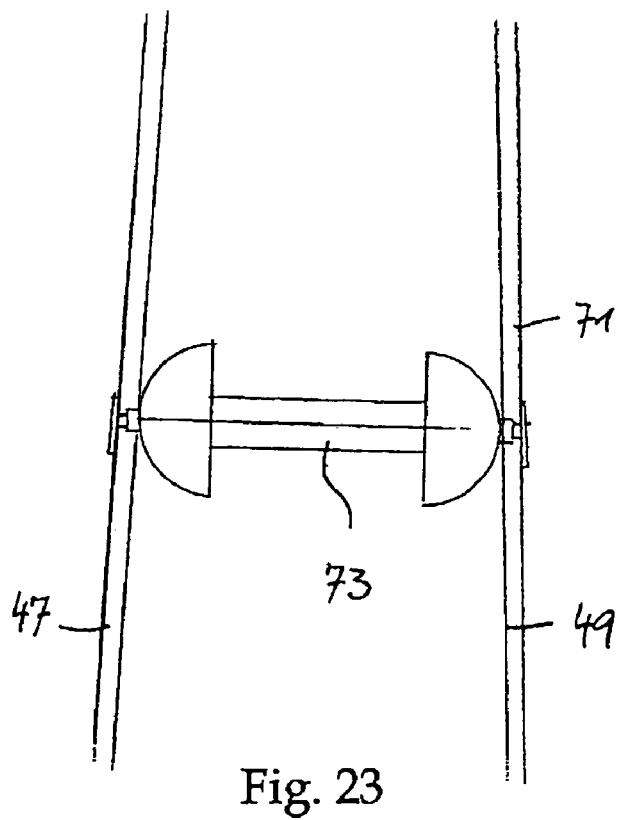
Fig. 23
Fig. 24
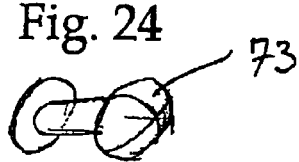
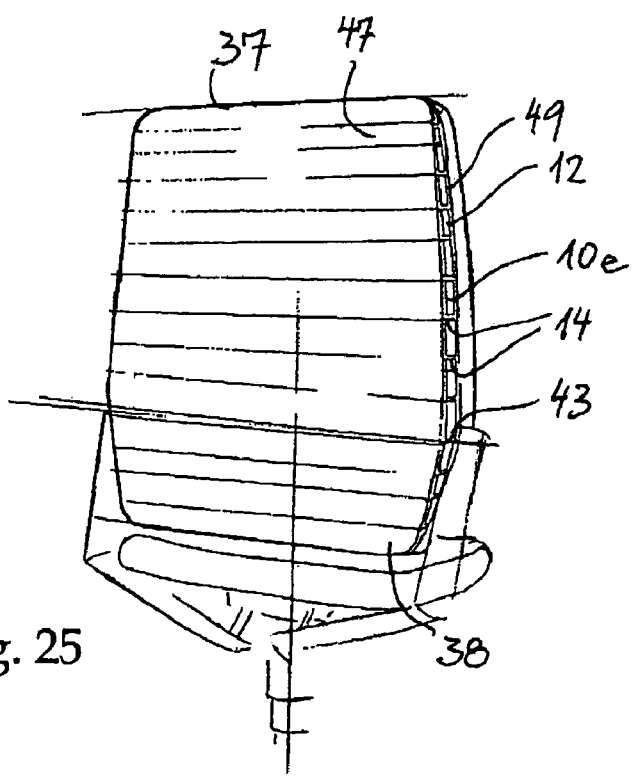
Fig. 25

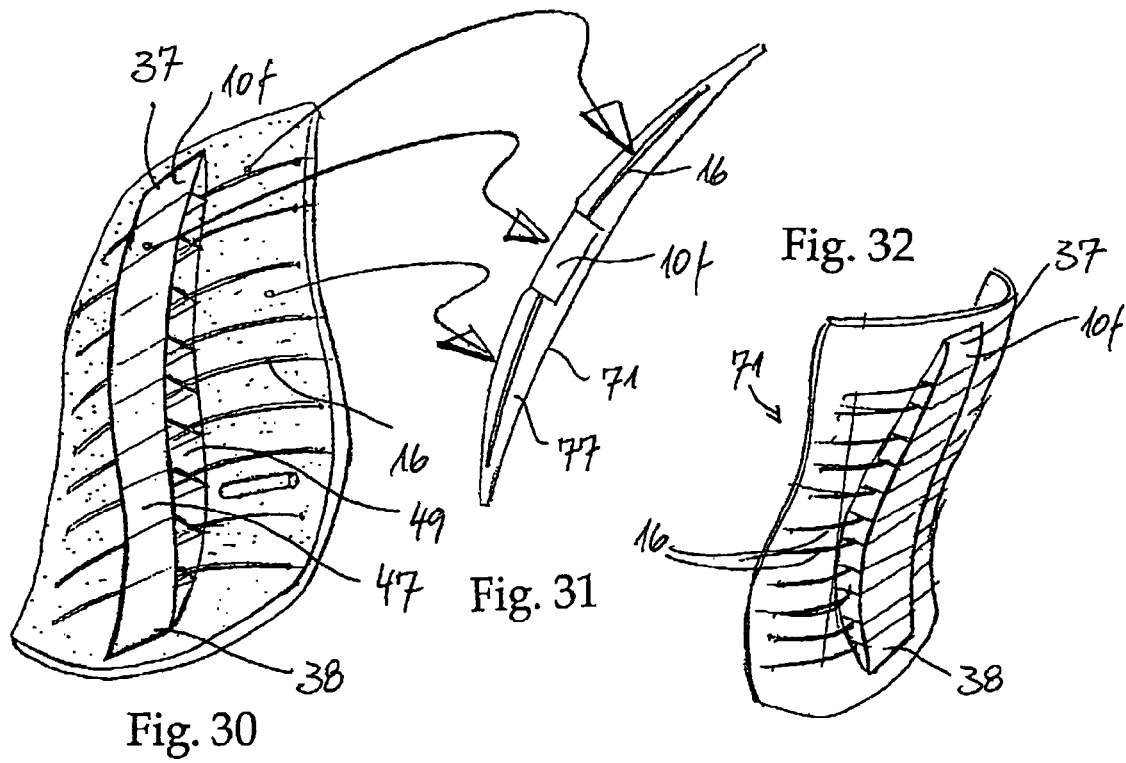
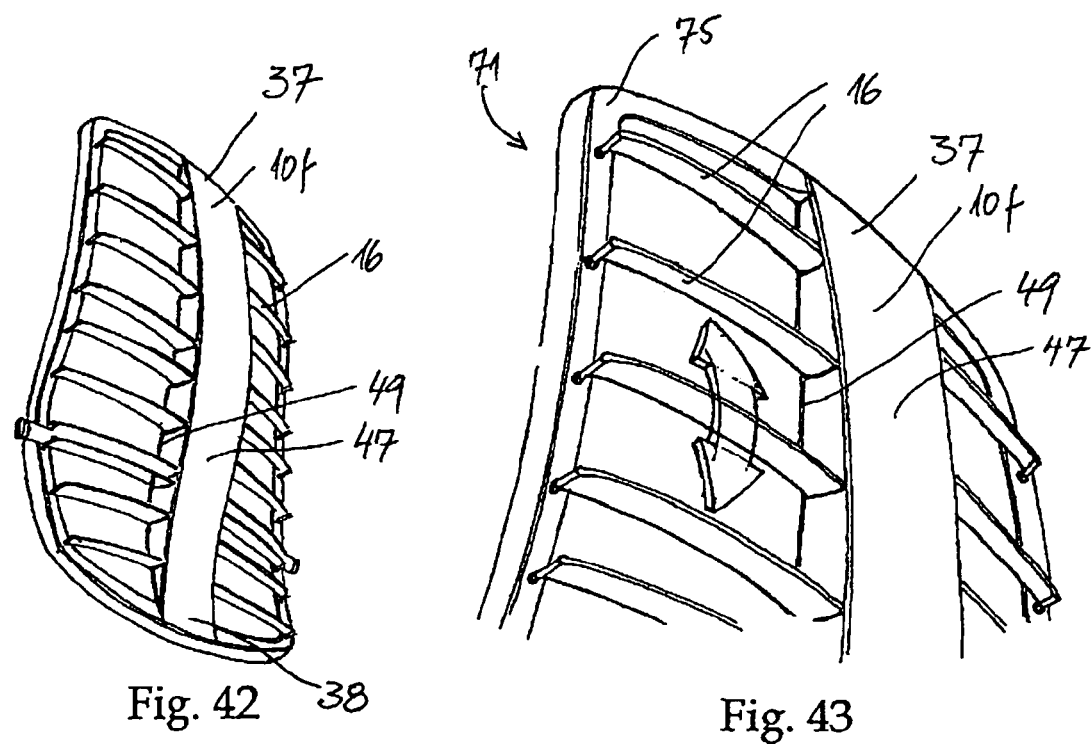

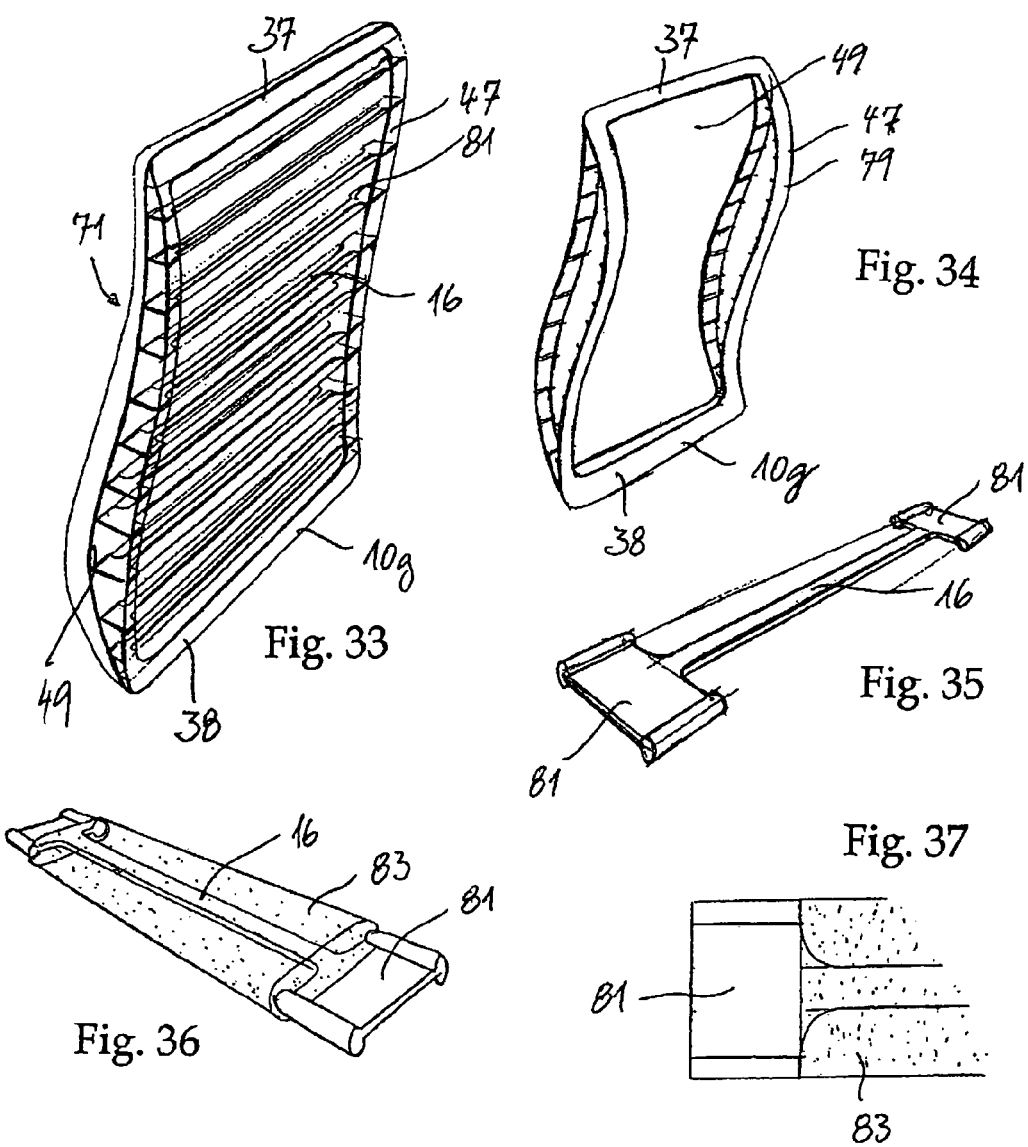

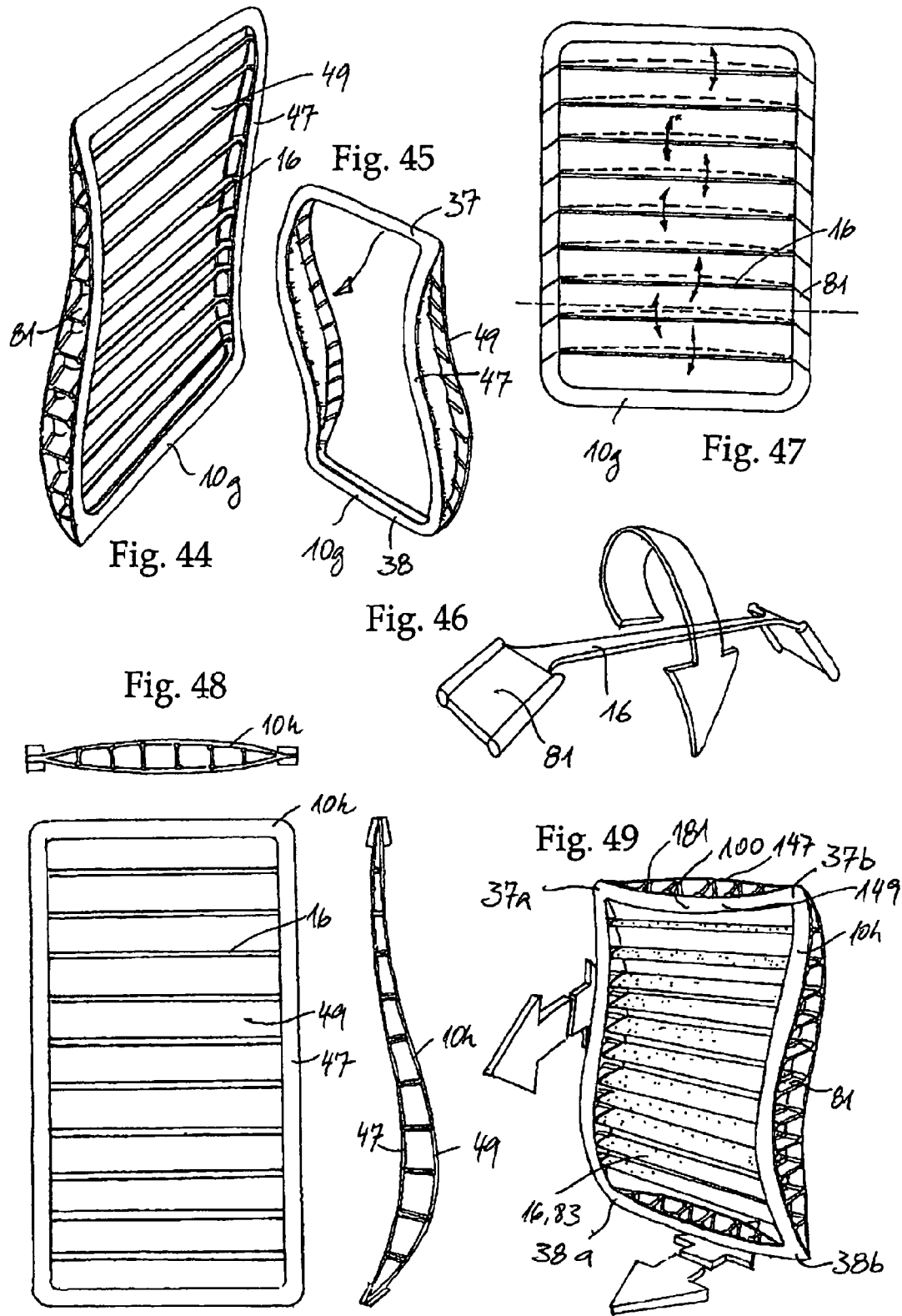

BACKREST FOR SEATS AND CHAIRS HAVING PRESSURE AND TENSILE ELEMENTS

FIELD OF THE INVENTION

The invention relates to a rest, for example a backrest for vehicle seats, that is to say car-, truck-, train- and aircraft-seats or a rest of a chair, in particular an office chair.

BACKGROUND OF THE INVENTION

A wide variety of backrests are known. Most are inherently rigid. A hard shell is provided only with upholstered padding on the seat side.

Ergonomic seating however requires flexible resilience corresponding to the body shape supported by the supporting element in each case. In particular due to the different sizes and seat positions flexible resilience corresponding to the back shape supported by the seat-back as well as permanent support of the pelvis boundary is required in order to prevent the pelvis from tilting to the rear.

The unclear text of the published EP-A-1040999, which is based on the similarly unclear application DE-A-19916 411, discloses a component for the absorption of forces, which component in the linear direction possesses a blunt and a pointed end and a flexible outer skin, which covers the component from the blunt to the pointed end on two sides. The component is to be fitted at the blunt end, while the pointed end should project freely. The outer skin forms a coherent, integral unit on the lower face and topside of the component. Lower face and topside are interlinked by cross struts. Connecting devices for the cross struts are formed on the inside of the outer skin. The cross struts are hinged in these connecting devices. Owing to the parallel aligned cross struts the flexible and dimensionally-stable outer skin is kept to a deformable profile. This structure of the component ensures that it moves against a force acting upon the outer skin. In this publication it is proposed that such a component can be fitted in chair-backs or seat areas. By connecting two frames (such a component should eventually be described as a frame), whose blunt ends are connected to one another by a hinge, a chair is created, which is able to seat a person and adjust to the anatomy of that person. FIG. 20, which as a single drawing illustrates a chair, shows an upholstered seat and a backrest, that are both designated with the reference number for one component. These two components are joined on a common pin and apparently flexibly held in a position relative to one another by a spring.

This chair concept was refined in the US Patent US-A 2004/0183348. This publication discloses a support element corresponding to the afore-described component, that possesses a skeleton, said skeleton exhibiting a skin, to which a plurality of ribs are attached. The skin forms a flexible support area for supporting a seating force, exerted by a body on the skin. This skeleton cooperates so as to at least partially deform said support area in a direction opposite the seating force as a result of said seating force. The skeleton further comprises at least one biasing element, which couples together skin and/or ribs, or the skin forms a backrest and a seat area as a unitary piece. The biasing action of the biasing element in particular causes the shape of the supporting element to be adjusted. For this purpose the biasing element is arranged in a diagonal of the rectangle, which consists of two ribs and the skin arranged on both ends of the ribs.

SUMMARY OF THE INVENTION

Such chair-backs have the advantage that the backrest matches the shape of the spinal column with concave deformation and supports the latter at each point to an equal extent. The adjustment in the concave region of the backrest happens due to the shape of the supported back and the forces exerted on the backrest by the latter. A disadvantage of these chair-backs however is that the convex deformation in the lumbar region forcibly results from the geometry of the supporting structure and the deformation in the spinal column region.

The object of the invention is to create a rest, which resiliently adapts to a back shape being supported. A preferred embodiment of the invention should create a good support especially in the lumbar region and pelvis boundary region.

This is achieved according to the invention by a backrest, and/or a chair or a vehicle seat with a backrest having the features of the independent claims. The dependent claims reproduce advantageous embodiments of the invention.

A generic backrest possesses a support area and at least one structure connected to the support area for forming the support area. This structure extends towards the top of the backrest from a first end region of the support area to a second end region of the support area and at the front exhibits a tension element and at the rear a pressure element. The tension element connects the first end region of the support area to the second end region of the support area while transmitting tensile forces. The pressure element is arranged between the first and second end region at a distance from the tension element and can take thrust forces. The pressure element is in the extension direction non-displaceably connected to the tension element in the first end region of the support area. Between the end regions the tension element and the pressure. element are connected to one another in the extension direction displaceably against each other by means of the spacers keeping the distance. Owing to this configuration of the structure deformation of the tension element and of the pressure element around neutral axes lying crosswise to the extension direction and displacement of the tension element relative to the pressure element must occur at the same time. As a result the backrest is adapted along a back shape supported thereon. Initially-loaded regions of the support area yield resiliently backwards. Due to the deformation of tension element and pressure element, upper and lower adjacent regions of the initially-loaded region are actively displaced forwards relative to the initially-loaded region and immediately come to lie against the back shape. Should the entire support area lie against the back, then this structure-related adjustment is complete and the backrest can only yield further as a result of its elasticity. Such a generic backrest exhibits at least one mounting element, in particular a bearing axis, with which it can be arranged or mounted on, in particular can be joined or is joined to a seat-back bracket.

The object of the invention is achieved with such a backrest due to the fact that the pressure element is likewise in the extension direction non-displaceably connected to the tension element in the second end region of the support area, and the mounting element is arranged at a distance from the first and second end region of the support area between these end regions. The backrest thereby possesses two support regions extending from the mounting element: an upper region between the mounting element and the first end region of the support area; and a lower region between the mounting element and the second end region of the support area. These support regions adjust to the back and if necessary can be pivoted around the bearing axis, so that pressure on the upper support region presses the lower support region onto the back. The configuration of the lumbar curvature results from the interaction of the deformation of the upper and the lower support regions. Therefore the supports in the spinal column region and the pelvis boundary region are interlinked.

Advantageously the mounting element is connected to the tension element and/or pressure element in such a way that this connection permits the tension element to be displaced relative to the pressure element in the region of the bearing axis, or the ability of the backrest to pivot around the bearing axis is created. Thus dynamic interaction of the deformations of the upper and the lower support region results. The deformation of the support region causes deformation of the other support region. The deformation of the structure of the one support region, oriented against the deforming force, acts upon the other support region thereby overlapping the bearing axis. The displaceability in the region of the mounting element irrespective of whether the ability to pivot on a bearing axis is created or not means that backward stretching in the spinal column leads to stretching of the upper support region and thus to curving of the lower support region and pressing of the lower end region against the pelvis.

Expediently the support area is mounted below its vertical centre and above the lower, second end region, and to be more precise for example around a horizontal axis or two axes inclined to one another.

Advantageously the spacers can be tilted relative to the tension element and the pressure element. Thus tilting of the tension element and the pressure element relative to the spacers occurs simultaneously with displacement and deformation of the pressure and tension elements. Both the deformation of pressure and tension elements and the tilting relative to the spacers can occur flexibly, so that energy is stored therein.

In advantageous embodiments of the invention the spacers together with the tension and pressure elements form in a cross section in the extension direction a polygon structure. This polygon structure in particular is at least a quadrangular structure. With such a polygon structure the angles of the polygon can be changed and/or the sides of the polygon can be deformed by loading. A quadrangular cross section changes like a parallelogram.

The tension element and the pressure element can be kept at a greater distance from one another in a central region than in the two end regions. The selected distance can affect the stiffness of the connection.

The stiffness of the connection between the tension element and the pressure element affects the behaviour of the structure. Increased stiffness of the connection prevents displacement of the pressure element relative to the tension element at this junction point. The stiffness of the connection can be variously influenced. Expediently the tension element and the pressure element are connected to one another more stiffly in the region of the bearing axis and less stiffly between the end regions and the bearing axis.

The tension element and the pressure element can be part of a flexible plastic profile. This plastic profile has for example a plurality of channels horizontally arranged in the seat-back, whose cross sections when loaded deform individually like a parallelogram with simultaneous deformation of adjacent channels.

Such a backrest, for example in the case of vehicle seats, therefore possesses a lower support region for the pelvis of a user, which prevents a pelvis supported by this support region from tipping to the rear. It also however possesses an upper support region for the spinal column. The seat-back exhibits a flexible plastic profile with a plurality of horizontal reinforcement chambers arranged in the seat-back divided by lamellas to form a quadrangular cross section, whose cross section when the seat-back is loaded deforms individually like a parallelogram with simultaneous deformation of the adjacent chambers. The seat-back is mounted between the upper and the lower support region. The lower support region in consequence of pressure with the spine on the upper support region is pressed against the pelvis. The upper and the lower support region adjust to the shape of the back and/or the shape of the pelvis and support the body with evenly distributed forces.

Reinforcement strips arranged perpendicularly to the extension direction can be connected to the pressure element, the tension element and/or the spacers, in order to transpose the effect of the structure towards the side onto lateral regions of the support area.

The reinforcement strips can be flat plastic strips, which are inserted in guides, that are present in lamellas separating the chambers. The reinforcement strips can also form a rear lining of the backrest movable around the neutral axes. Expediently the reinforcement strips of such a lining are fastened to the pressure element by means of flexible tongues, in particular rubber tongues, which engage into corresponding slots in the pressure element.

Advantageously the structure is formed in a central region only, and regions of the support area lying laterally near this central region are supported by means of reinforcement strips running parallel to the neutral axes. These reinforcement strips can be fixed to different parts of the structure. Several reinforcement strips can be fixed to the spacers or the pressure element.

The reinforcement strips at their outer ends can be connected to the support area or a frame around the support area and/or they can be embedded in upholstered padding.

In the case of a preferred backrest structures in the sense of Claim 1, which are distinguishable from each other are present in at least two places of the seat backrest at a distance from one another. Each of these structures comprises a tension element, a pressure element and spacers. These structures can be preferably arranged in a boundary region.

The spacers of these distinguishable structures can be connected to one another. Further the neutral axes of a structure can deviate from a parallel to the neutral axes of a second structure. This deviation can be achieved in various ways. One possibility consists of configuring the neutral axes in a cross section crosswise to the extension direction at an angle other than 0 and 180 degrees to one another. This is achieved for example due to the fact that lamella-like spacers are joined parallel to such neutral axes on the pressure element and tension element.

A further possibility is provided by arranging the neutral axes in a cross section parallel to the support area at an angle other than 0 and 180 degrees to one another. A further possibility consists of aligning the neutral axes at an angle other than 90 degrees to the extension direction. All three possible deviations from the parallel alignment can also be combined with each other.

Deformation of the entire backrest around a neutral axis parallel to the top of the backrest in dependence of deformation around the horizontally running neutral axes can be achieved by such deviation from the parallel alignment of the neutral axis of two distinguishable structures. Such a combined deformation in two over-crossing directions generates a flexible resetting force for restoring the deformation.

Thus it is possible for this resetting force to be adjusted by changing the angle of deviation from the parallel alignment.

In advantageous embodiments the tension element and pressure element enclose a leak-proof space and are equipped with an inlet for a medium. Further only individual leak-proof inflatable elements can be inserted between the pressure element and tension element. With both embodiments the stiffness of the connection between the pressure and tension element can be adjusted through the pressure in the leak-proof space.

The spacers need only to be able to offer resistance to tensile force in a space filled with positive pressure.

The spacers can be provided in a variety of ways. The spacers can be formed by a honeycombed profile having honeycombed cross section channels or formed through elongated lamellas joined to the tension element and the pressure element. Such lamellas can be arranged in rows that are staggered relative to each other.

The spacers can be formed by sidewalls of a profile or channel having a quadrangular cross section. The tension element and the pressure element are then expediently constructed of a plurality of such quadrangular profiles, which are arranged in rows side-by-side and flexibly connected to one another.

Furthermore the spacers can be pin-shaped. This permits the spacers to be connected with ball and socket joints to the tension element and the pressure element for example.

The spacers can also be formed by elements, which extend along an even-faced curve or however along a dimensionally inclined curve.

The adjusting effect of the structure with the tension element and pressure elements, which are non-displaceably connected to one another in two places, and between said places spacers, which permit displacement of the pressure element relative to the tension element when both deform, can also be used in the width direction of the backrest. Accordingly in the case of an advantageous backrest a transverse structure expands crosswise to the extension direction into the backrest width. This transverse structure can be deformed around neutral axes directed crosswise to the expansion direction and exhibits a tension element at the front and a pressure element at the rear. Tension element and pressure element are non-displaceably connected to one another in two places and between these in the expansion direction displaceably connected to one another by spacers.

Advantageously the tension elements of the expanding structures and of the structures extending crosswise thereto form a unit. Likewise it is expedient if the pressure elements of the expanding structures and of the structures extending crosswise thereto form a unit. The tension elements and/or pressure elements preferably form a frame bordering the support area. The support area can be stretched in this frame and manufactured from an elastic fabric for example.

Expediently in this case the spacers non-displaceably connect the pressure element and the tension element to one another in a first direction, in order to create a non-displaceable connection for the structure expanding in the other direction, and displaceably in a second direction lying crosswise thereto, in order to permit displacement extending in this direction together with deformation of the pressure and tension elements of the structure.

The invention also relates to a chair or a vehicle seat with a backrest according to the invention.

Expediently the backrest can have a plastic profile with a plurality of chambers, which are horizontally arranged extending in the seat-back. The seat-back is mounted on the chair frame around a horizontal axis, which is below the vertical centre of the seat-back and at a distance from the lower end of the seat-back.

In certain embodiments of the invention substantially horizontally arranged reinforcement strips are provided. These can be flat plastic strips, which are horizontally arranged in corresponding guides lying in the chambers. A rear lining of the seat-back, which is attached to the structure by means of rubber tongues engaging into corresponding slots, consisting of plastic lamellas, movable in itself around a plurality of horizontally tilting axes, may be provided.

The backrest or the structure extending towards the top of the backrest is preferably made pivotable around the bearing axis against a bias action. This causes the rest to adjust as a whole to the back curvature.

Preferably the functional structure is arranged behind the support area, whereby the support area can form the tension element. In addition it is however also conceivable that vice-versa the pressure element forms the support area or bears the support area, and the tension element is arranged at the side and lies ahead of the central region of the support area.

In the case of a preferred embodiment where the support area is ahead of the structure the supporting element, in particular the backrest, possesses a front support area. The supporting element can be deformed around tilting axes, which are aligned perpendicularly to its extension direction.

Such a supporting element not only can form a backrest, but also a neck support or an arm rest for example. In this context the term rest can also be applied to other supporting elements.

The supporting element is mounted between the two linear ends and is provided with a rear pressure element. The pressure element is arranged at a distance from the front support area. The support area and the pressure element in the two end regions are directly connected (triangular-shaped) and in a central region connected to one another by spacers (bars, webs) forming a quadrangular structure. This quadrangular structure can be deformed like a parallelogram by loading the supporting element.

The structure can be achieved by a plastic profile, which in a central region exhibits chambers with an approximately quadrangular cross section, but at the ends exhibits chambers with an approximately triangular cross section.

In this case it is advantageous that as the result of a plastic profile with a plurality of horizontal chambers resilience can be achieved by the flexible chamber sidewalls and rigid lamellar bars between the chambers, which in particular allows the seat-back to be deformed to the front and rear around neutral axes at the lamella edges, in the case of backrests around horizontal neutral axes.

The flexibility can be individually adjusted by different filling of the chambers, while by different dimensioning of the chambers according to the different position of the chambers in the seat-back varying stiffness can be produced section-wise already at the time when the backrest is being manufactured.

It is also proposed to prevent lateral bending of the seat-back if the load is not centric by additional pressure elements in the chambers. The seat-back can only mould itself as a whole to the spinal column and/or assume the shape of the back. Thus at the same time too soft a seat-back, in particular a dip in the centre, is avoided.

Because the plastic profile is overall reinforced at the back for example by a lining, which is mounted on the individual chambers, when the seat-back is tilted the positive effect of the seat-back totally pressing firmly forward onto the back in the lower region above the pelvis (in the lumbar region of the back) is maintained. In this case the shape of the human back in this region is taken into account and pressure is evenly exerted.

BRIEF DESCRIPTION OF THE DRAWINGS

Further advantages and features of the invention will become clear from the description below of preferred embodiments on the basis of the attached drawings, wherein FIG. 8 is a perspective sketch of a backrest with ribs inserted between a front layer (tension element) and a rear layer (pressure element) of a seat-back profile, FIG. 9 shows the same backrest in a view with the ribs inserted on staggered locations therein, FIG. 10 is a perspective sketch of such a rib, FIG. 11 is a cross section through a rib, which is displaceably connected to the front and rear layer of the seat-back profile, FIG. 12 is a perspective sketch of a backrest with a seat-back profile, which is filled with a honeycomb-tube-like structure and equipped with upholstered padding, FIG. 13 is a cross sectional view through the backrest in FIG. 12 with a spinal column supported on it, FIG. 14 is an illustration of such a structure, FIG. 15 shows an enlarged drawing of a backrest with a seat-back profile and an inflatable insert, FIG. 16 shows a punched partition of the inflatable insert, FIG. 17 is a perspective sketch of a backrest, which is composed of various profiles over rubber springs, FIG. 18 is a detailed sectional view, in which the composition of the rear pressure element consisting of wooden lamellas, aluminium profiles and rubber springs is illustrated, FIG. 19 shows a rubber spring FIG. 20 is a perspective sketch of a seat having a backrest with a seat-back profile, containing steel spring hoops as spacer elements and upholstered padding, FIG. 21 is a detailed illustration of a steel spring hoop and its connection with the seat-back profile, FIG. 22 is a sectional view through a supporting element with a supporting profile and containing a plurality of rod-shaped spacer elements, FIG. 23 is a detailed sectional view through the supporting element with a spacer element, FIG. 24 shows a spacer element, FIG. 25 is a perspective sketch of a seat with a backrest made from a transparent seat-back profile extruded from plastic, and upholstered padding.

FIG. 30 is a sketch explaining a variant of the backrest in FIGS. 28 and 29, wherein the functional frame is integrated into a foamed backrest, that is to say arranged inside the foam section, FIG. 31 is a cross sectional view through this backrest, FIG. 32 is a second perspective sketch of the same backrest, FIG. 33 is a perspective sketch of a backrest, wherein the seat-back profile is connected by bars only at the edges, FIG. 34 shows the seat-back profile without bars with a front, total support area and two rear pressure elements, running along the edge of the support area, FIG. 35 shows a rib or bar for inserting into the seat-back profile, which rib between the end regions exhibits recesses, which permit flexible support on the support area, FIG. 36 shows such a rib with polyurethane foam doubled up in the region of the recesses, FIG. 37 is an end region of the rib viewed from above, FIG. 42 shows a backrest with circumferencial frame, which is connected by means of ribs to a centrally arranged functional structure, FIG. 43 is a detailed view of the mounting of the ribs, FIG. 44 shows a backrest with the functional structure each in the lateral parts of a frame, wherein the spacers can be pivoted in the two lateral parts around axes, which are not parallel to one another, FIG. 45 shows the frame without spacers, FIG. 46 shows a rib, which bears a spacer for both lateral frame parts, FIG. 47 is an illustration of the effect of an angle between the neutral axis of two structures extending roughly parallel, FIG. 48 is a front view, a side view and a top view onto a backrest with a frame, wherein a structure is formed in each case between two corner points, FIG. 49 is a perspective sketch of the backrest in FIG. 48.

DETAILED DESCRIPTION OF THE PREFERRED EMBODIMENTS

Figures 1, 2:
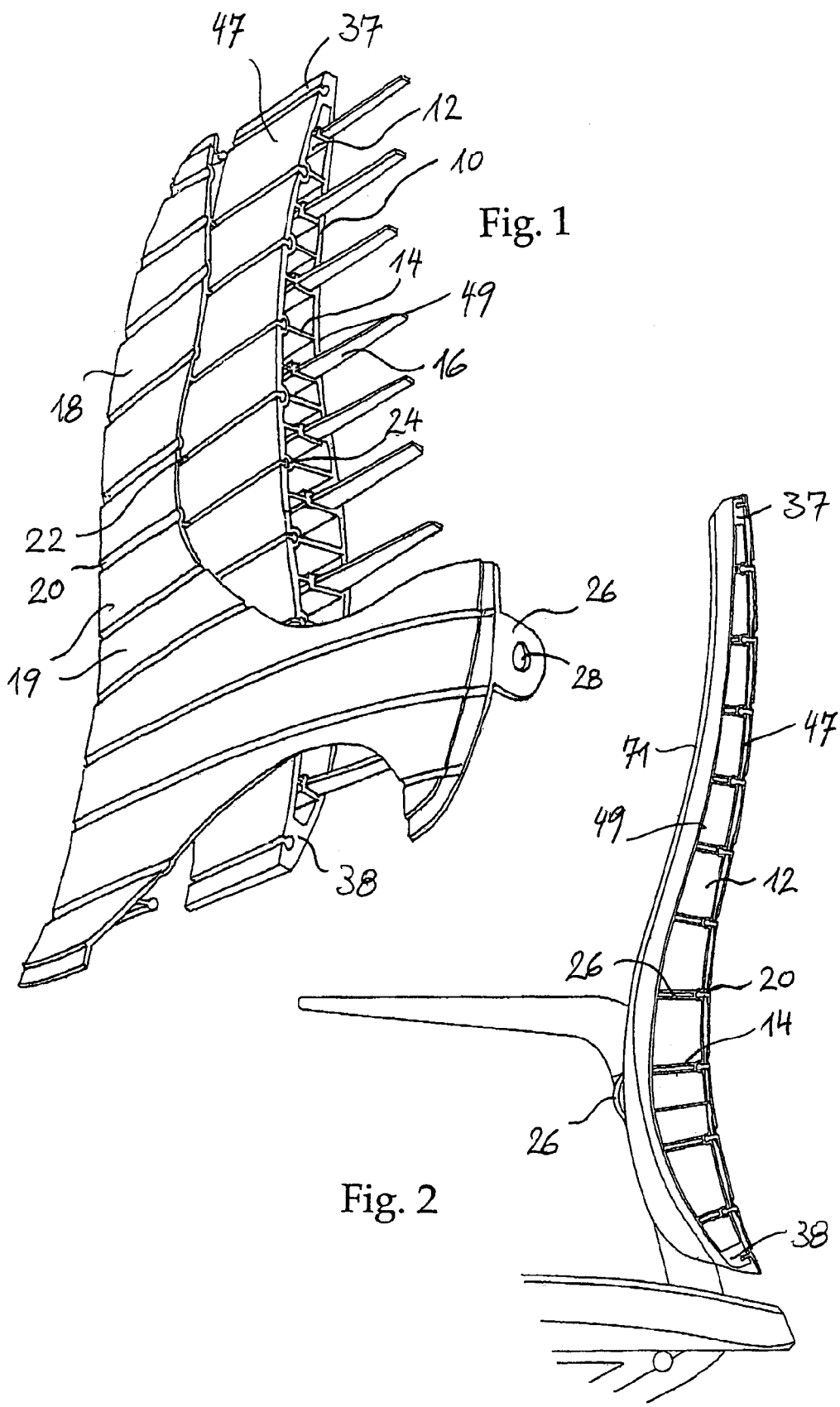
FIG. 1 is a schematic representation of the components of a seat-back according to the invention in a partial sectional view, with support strips in each second lamella wall.
FIG. 2 is a sectional drawing through an office armchair seat-back with support strips in each lamella wall.

The plastic profile 10 illustrated in FIG. 1 exhibits a plurality of individual chambers 12, whereby lamellar bars 14 are formed between these chambers and in some of the bars (in FIG. 1 in every second bar) further slots are provided for receiving reinforcing strip-shaped elements 16, which protect the plastic profile against deformation around a vertical axis.

A rear reinforcement 18 is formed through second plastic lamellas 19 arranged individually on top of one another, vertically aligned and extending horizontally, which by means of PVC rubber sections 20 located in-between do not offer any resistance to the body-related deformation of the seat-back around horizontally tilting axes.

Instead of the plastic lamellas proposed a continuous lamella shell could also be used as an alternative.

The rubber sections 20 of each lamella 19 in a preferred embodiment exhibit rubber tongues 22, which engage in corresponding slots 24 of the plastic profile 10. Mounting tongues 26 projecting forward into the arm rest region are provided on the rear reinforcement as support of the entire supporting element for a horizontal axis of rotation. This imaginary axis is formed by revolving joints 28 and pins or the like inserted therein.

In FIG. 2 the structure according to the invention is again illustrated in cross section. The rubber sections 20 as black sections each connecting two plastic lamellas to one another can be clearly recognized. Otherwise than in FIG. 1 here a strip-shaped element 16 is inserted in each lamellar bar 14.

Figures 3, 4:
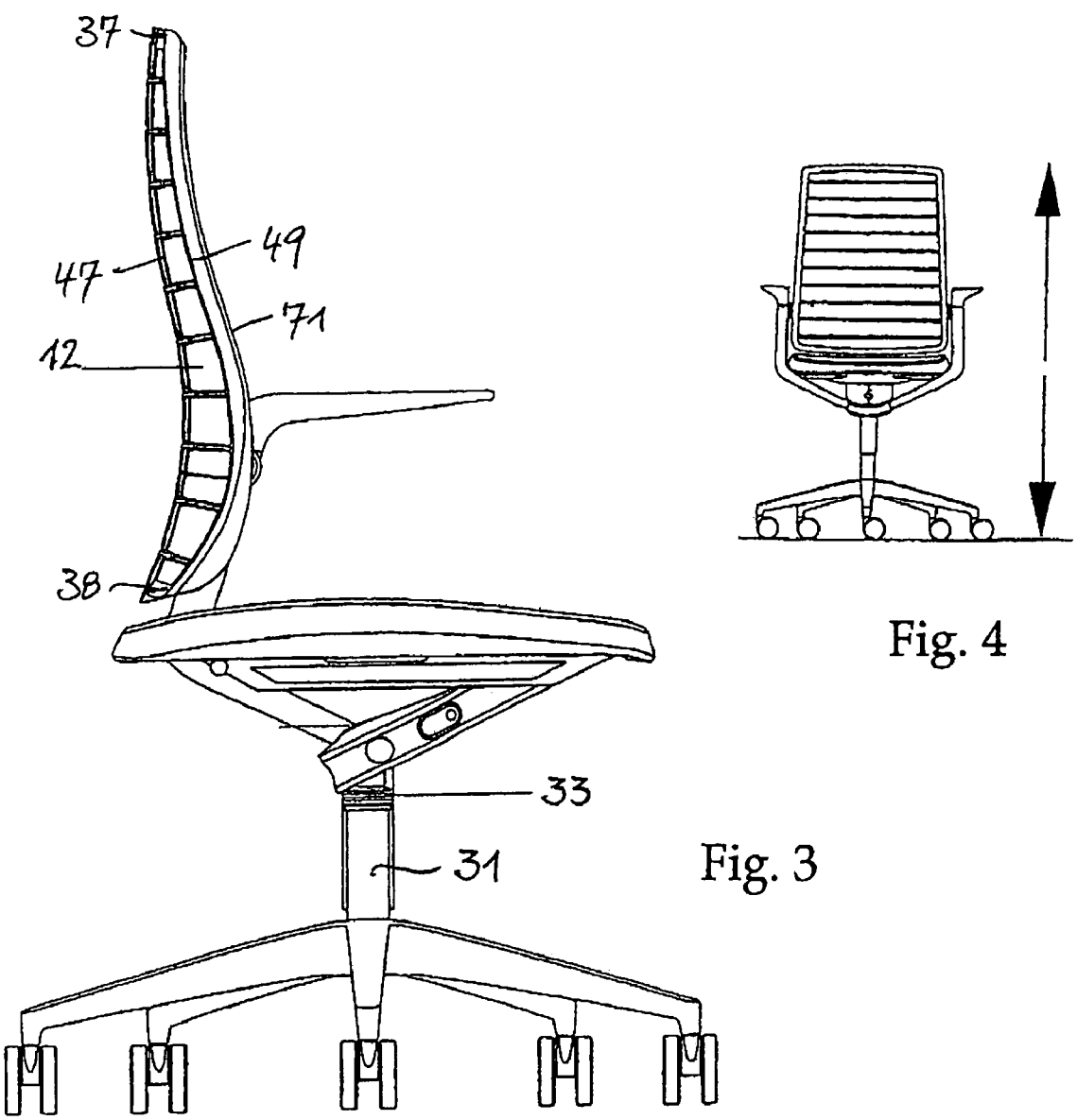
FIG. 3 is a view of a chair according to the invention, with seat-back illustrated in cross section.
FIG. 4 is a schematic representation of a pump movement for inflating the chambers.

In FIG. 3 finally the entire chair equipped with a gas spring 31 having a pump gaiter 33 arranged on top for inflating individual air chambers 12 is illustrated.

In FIG. 4 it is purely schematically represented how sufficient air pressure is produced by an up and down motion of the user sitting on the chair, in order to inflate individual chambers to a greater or lesser degree.

Figure 6:
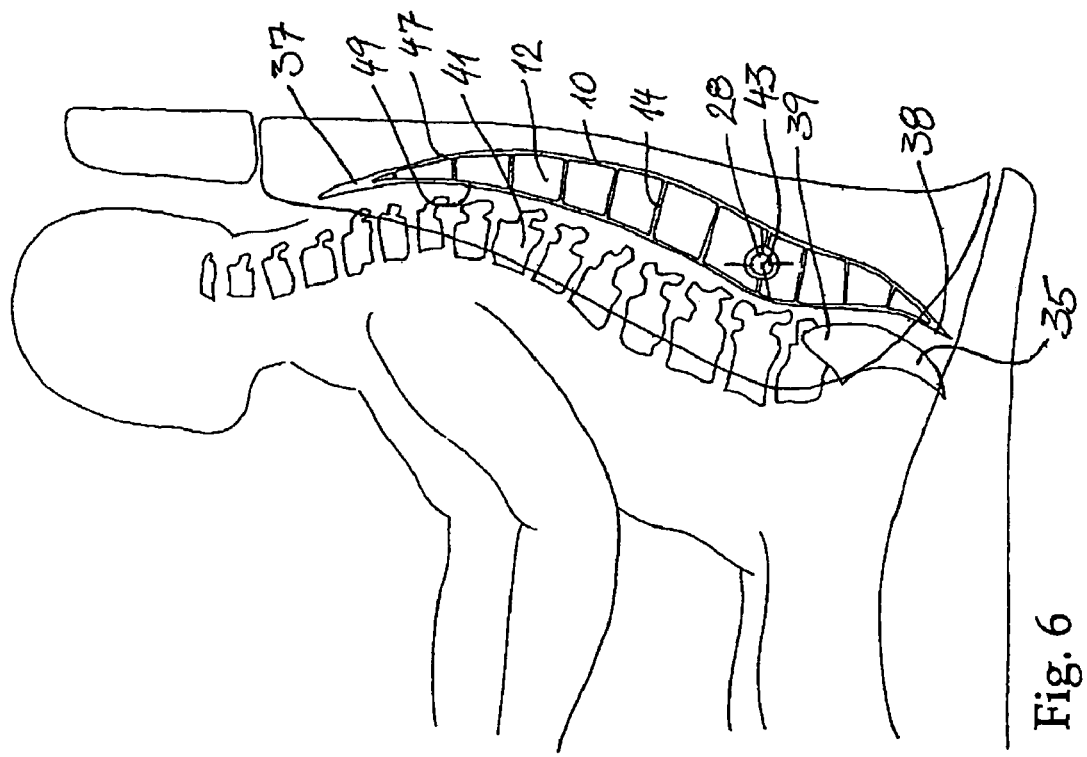
FIG. 6 is a sectional view of a car seat with such a profile under load, FIG. 7 schematically shows an inflating device.
Figure 5:
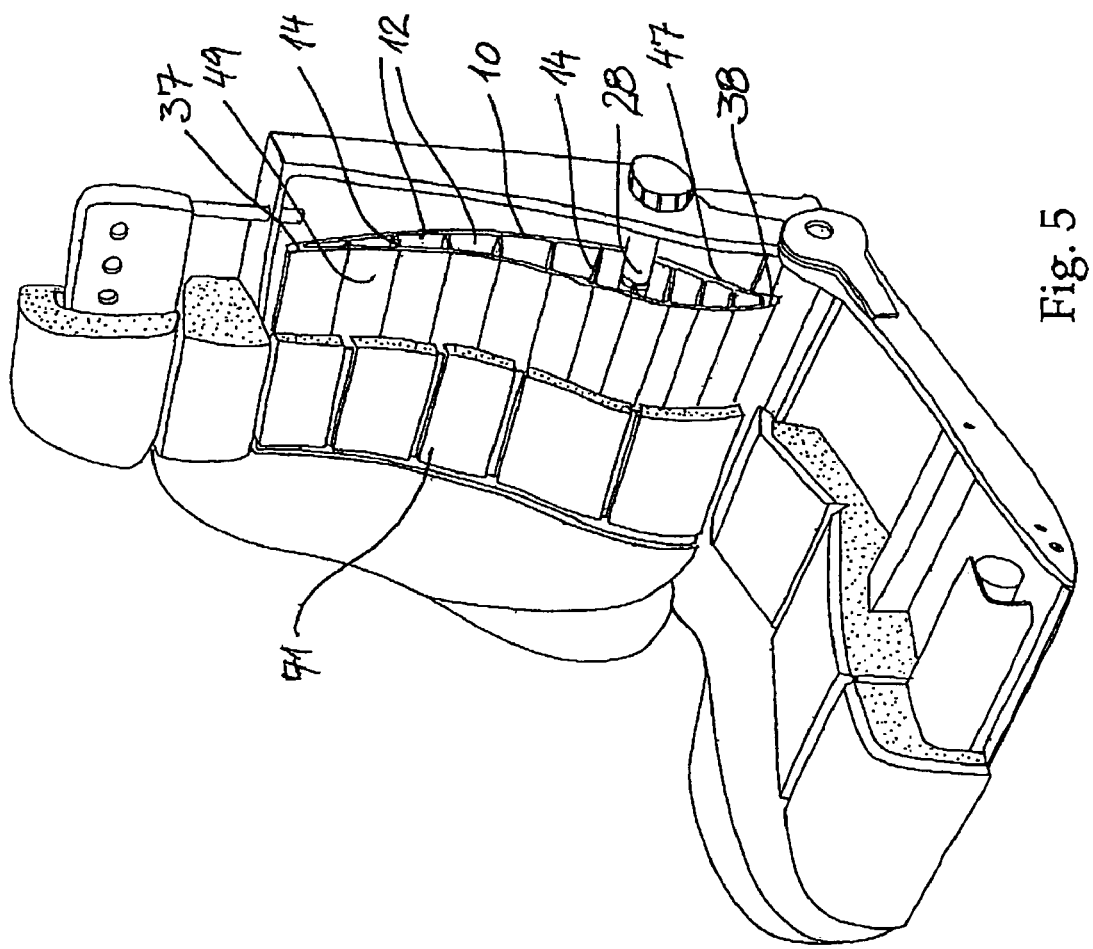
FIG. 5 is an illustration of a car seat wherein a simpler profile provided with horizontal chambers is used.

In FIGS. 5 and 6 the structure according to the invention is again illustrated in cross section with the example of a car seat. It is clear to see that through a thickness of the profile 10 tapering at the lower end 38 (shortening of the lamellar-bars 14 relative to their depth) pressure on the tail bone 35 is minimized. A pelvis boundary region resting against the pelvis 39 of the user sits directly on the mounting retaining the seat-back and therefore prevents the pelvis from tipping to the rear.

The flexible plastic profile 10 with a plurality of reinforcement chambers horizontally arranged in the seat-back is also easy to recognize. The cross section of the individual reinforcement chambers 12 when the seat-back is loaded by the spinal column 41 of the user deforms like a parallelogram with simultaneous deformation of adjacent chambers 12. In this case the lamellar bars 14 separating the chambers 12 are tilted and only a little bent.

In this case further coupling of the lamellar bars 14 can take place as the result of a shell 18 lying outwardly on the profile 10. A rear lining of the seat-back constructed of plastic lamellas 19, which is attached to a profile 10 containing the air chambers by means of rubber tongues 22 engaging into corresponding slots 24, movable in itself around a plurality of horizontally tilting axes, can form (as in FIG. 1) such a shell 18 lying outwardly on the profile 10. This shell 18 results in distribution of the pressure owing to the interconnection with the lamellar bars 14.

Therefore on the one hand with the actuating pressure of punctual loads (for example in the centre through swirl) light resilience can result in the case of a soft lamellar bar material. On the other hand sufficient resetting force is produced for integral deformation of the rest resting against the spinal column by the adjacent lamellar bars 14, in particular if the chamber walls are reinforced by the plastic lamellas 19 of the shell 18.

The rest is mounted on a seat base around a horizontal axis 43 below the vertical centre of the rest, preferably just above the pelvis boundary region.

As a result of horizontally aligned reinforcement strips 16 arranged in the plastic profile 10 12 between two chambers, inflating the chambers 12 with air for example, filling the chambers 12 with a foam-like material and reinforcements, which are inserted in corresponding guides provided in the chamber walls, the "hardness" of the rest can be adjusted (if necessary also only section-wise).

In FIG. 7 finally an inflating device 45, which can be inserted into the chambers 12 of a profile 10 is schematically represented. The stiffness of the chamber can be increased by inflating the bodies arranged in the chambers 12.

With the embodiment in FIGS. 8 to 11 ribs 51 are inserted as spacers in a seat-back profile 10a made of plastic between a rear pressure element 47 and a front tension element 49. In the profile 10a retaining grooves 53 (FIG. 11) are formed, into which the ribs 51 can be inserted. The ribs 51 are displaceably arranged therein. There are present three rows of ribs 51, which are arranged side by side and staggered with respect to each other. The ribs 51 become narrower towards the upper and the lower edge of the rest.

With the embodiment in FIGS. 12 to 14 the spacers inside the seat-back profile 10b are formed by a profile element 55 with a tube-like structure, which structure has a honey-combed cross section. The structure can exhibit hexagonal or octagonal and quadrilateral tubes in the cross section for example.

With the embodiment in FIGS. 15 and 16 the functional structure is an inflatable element 57 in a backrest. The air chamber is also kept dimensionally stable by air-permeable spacer foils. These spacer foils 59 (FIG. 16) only absorb tensile forces. Thrust forces are transmitted via the filling medium. Such an element can be filled with a liquid or with a gas. For this purpose the inflatable element only requires a valve for filling the latter. In FIG. 15 a pump 61 is also illustrated. The inflatable element 57 can be inserted in a backrest 10c. Tension element 49 and pressure element 47 are formed in FIG. 15 by the backrest 10c, the spacers being formed by the inflatable element 57 inserted therein.

The backrest 10d illustrated in FIGS. 17 to 19 is composed of a plurality of hollow sections 63, which are connected to one another by flexible rubber springs 65. A hollow section 63 can be formed from a U-shaped profile, whose open side is closed by a wooden diaphragm 67 for example.

With the embodiment in FIGS. 20 and 21 the spacers are formed by wire ribs 69 bent wave-like in a plane. These keep the tension element 49 and the pressure element 47 at a distance and can be deformed in themselves around axes perpendicular to their linear dimension. This permits the support area 71 to be adapted also perpendicularly to the linear dimension of a spine 41 supported on it. The wire ribs 69 are pivotally connected to the latter at the points of contact with the pressure element 47 and the tension element 49.

With the embodiment in FIGS. 22 to 24 the spacers are spacer pins 73, which are connected with ball and socket joints to the tension element 49 and pressure element 47. These therefore allow displacement of the pressure and tension elements against one another in all directions parallel to the dimensions of the support area 71.

Figure 26:
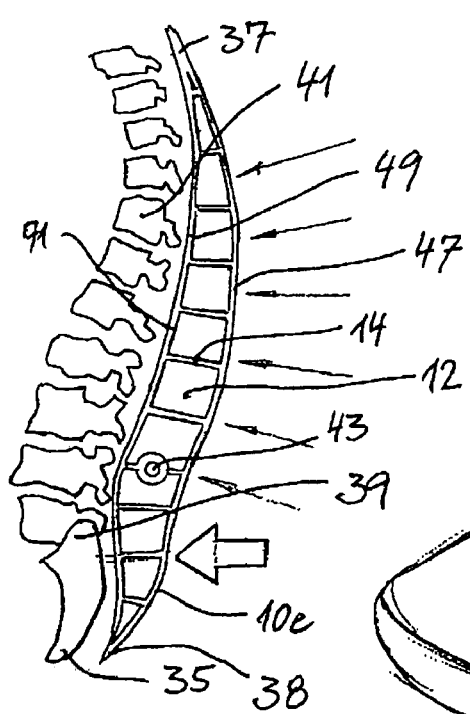
FIG. 26 is an illustration explaining the supporting function of the seat-back profile in the direction of its linear extension.
Figure 27:
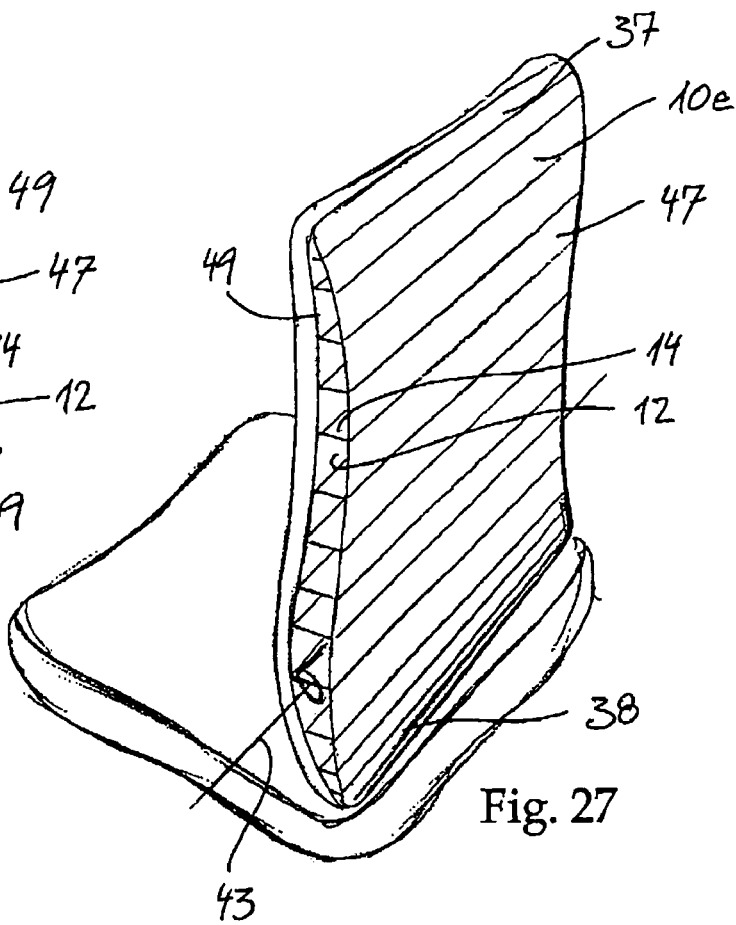
FIG. 27 is a second perspective sketch of the same seat.

With the embodiment in FIGS. 25 to 27 the functional structure is a plastic profile 10e with quadrangular channels lying horizontally therein. The channels or chambers 12 are limited by the faces of the pressure element 47 and the tension element 49 and the spacer lamellas 14 extending horizontally between the channels. The bearing axis 43 is arranged in one of these spacer lamellas 14. Since the lamella is flexible and the bearing axis 43 does not cover the entire width of the lamella, also in the case of the bearing axis 43 the pressure and the tension elements are connected to one another displaceably against each other. However the displaceability is less compared to the displaceability in the case of adjacent spacer lamellas 14.

Figure 29:
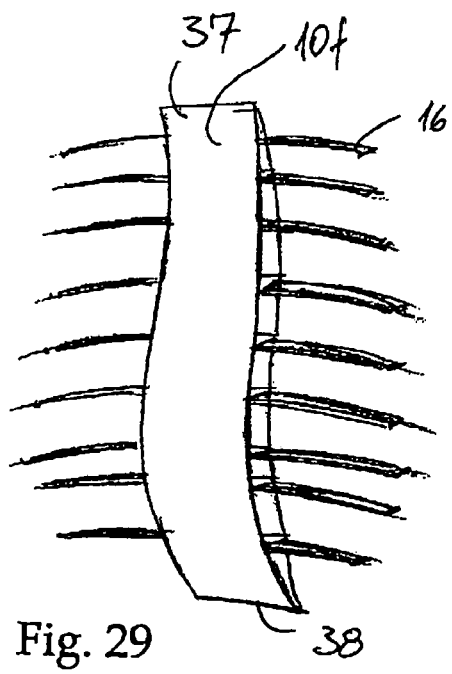
FIG. 29 shows the functional frame of the backrest in FIG. 28
Figure 28:
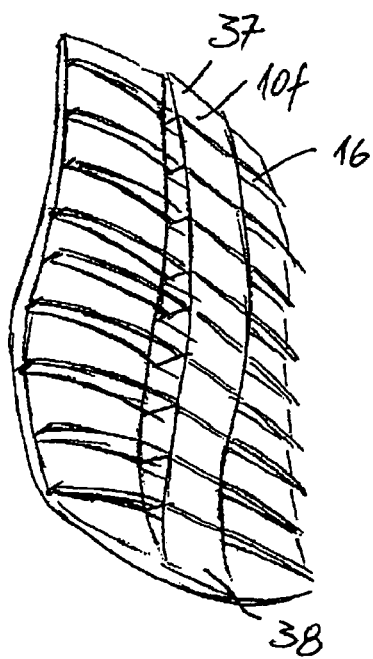
FIG. 28 is a perspective sketch of a backrest with a central seat-back profile widened by ribs, providing the supporting function, and upholstered padding.
Figure 38:
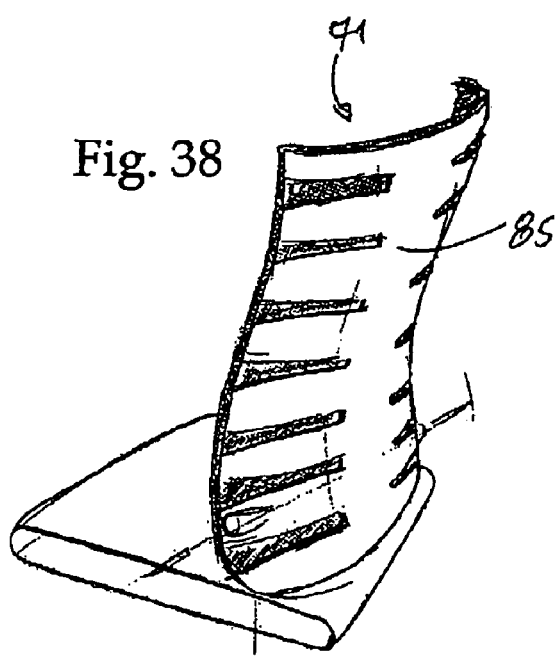
FIG. 38 is a perspective sketch of a seat with a backrest, exhibiting a rear pressure element, which is slit laterally.
Figure 39:
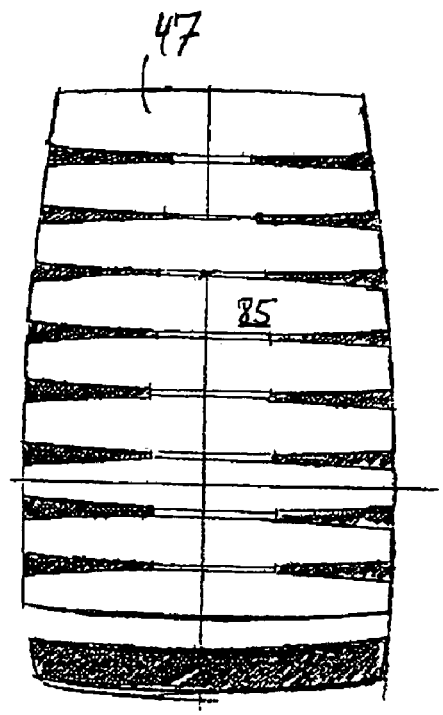
FIG. 39 is a rear view of the pressure element.
Figure 40:
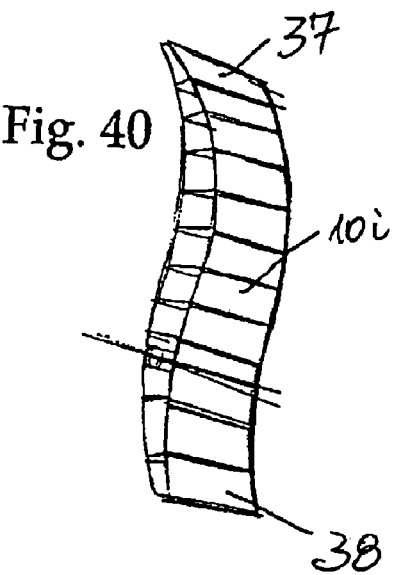
FIG. 40 shows the functional part, which is arranged in the central region of the backrest and connected to the reinforcement part.
Figure 41:
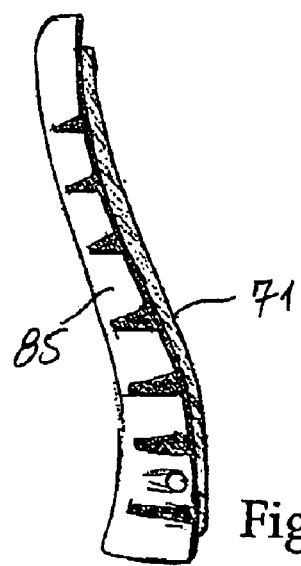
FIG. 41 is a side view of the backrest.

In the embodiments of FIGS. 28 and 29, as well as 30 to 32, or 42 and 43 a centrally arranged functional structure 10f is present, whose effective region is expanded by ribs 16 to the entire width of the backrest. The interaction of narrow, functional structure 10f and ribs 16 projecting into the width permits concave deformation of the backrest, without the effect of the functional structure being obstructed as a result. The projecting ribs 16 are not fixed at a steady distance relative to one another, as is the case with the spacer lamellas 14 of the central structure 10f. Therefore they can freely follow the movement of the functional structure 10f, also such having a curved form.

With the embodiment in FIGS. 42 and 43 however the ends of the ribs 16 are connected to a frame 75. This keeps the ribs at a given distance from one another. As a result a certain tension is generated in the concavely projecting ribs when the functional structure 10f is deformed. This tension can be used as resetting force for the backrest.

With the embodiment in FIGS. 30 to 32 the ribs 16 are formed by wires, which are embedded in a foam section 77. The foam flexibly yields to the deformation of the ribs 16 and thereby likewise results in a resetting force for the backrest.

With the embodiments in FIGS. 33 to 37 and 44 to 47 the functional structure 10g is formed in two lateral frame parts 79. The spacers are formed by short spacer lamellas 81, which relative to the pressure element 47 and the tension element 49 are tiltably fastened thereon. In each case two spacer lamellas 81 are formed on a rib 16 and in FIGS. 33 to 37 axially aligned to one another. The rib 16 connects the left-side structure 79, 81 to the right-side structure 79, 81. The rib 16 in FIG. 36 is covered with upholstered padding 83, which flexibly supports the central region of the support area 71. In FIGS. 44 to 47 the spacer lamellas 81 are not axially aligned with one another. The tilting axes of both spacer lamellas 81 arranged on a rib 16 are aligned at an angle of approx. 120 to 140 degrees to one another. Therefore if the lamellas 81 tilt in consequence of a force pressing on the support area 71 distortion of the rib 16 takes place. The force stored in the distortion can be used as resetting force for the backrest. The distortion can be provided in such a manner that the backrest deforms concavely in a horizontal section line.

In FIGS. 48 and 49 a backrest is illustrated, wherein a functional structure 10 described is in each case integrated horizontally and vertically in a frame 10h. Because at the corner points the pressure element 47 and the tension element 49 are non-displaceably connected to one another in all directions, the horizontal as well as the vertical structure 10 can deploy their kinematics. The support area 71 is a—not illustrated—elastic fabric stretched over the frame 10h, which assists the movement in both directions. The backrest can also be pre-formed concavely in the horizontal direction.

The frame can also be equipped with lamellas 81 as spacers equally wide throughout. At the fixing points, here in the corners, the pressure and the tension elements can be arranged at a distance from one another, so long as displacement of the pressure and tension elements against one another in the direction of the linear dimension of the structure 10 is prevented. Such displacement can be prevented just by arranging the spacer lamellas 81 non displaceably and non tiltably on the pressure element 47 and tension element 49. Since they exhibit a certain length, a good deal of resistance also counteracts any displacement with simultaneous deformation of the spacer lamellas 81 in this extension direction.

The arrangement illustrated of two of the lateral spacer lamellas 81 in each case on a common rib 16 is not absolutely necessary.

With the embodiment in FIGS. 38 to 41 the functional structure 10i is connected to a rear lining 85. This lining is fanned out finger-wise towards the side and in this region concavely curved against the support area 71. Therefore a backrest can also be created in a horizontal line. The lining takes over the function of the ribs 16 in the examples shown in FIGS. 28 to 32.

What is claimed is:

1. A backrest with a support area extending from a first and lower end region to a second and top end region for supporting the back of a user, said backrest comprising:
    at least one mounting element for mounting the backrest to a backrest bracket, said at least one mounting element being arranged between the end regions at a distance from the first end region and at a distance from the second end region of the support area, and
    at least one extended structure with a tension element at the front side of the structure and a pressure element at its rear side, both the tension element and the pressure element extending from the first end region of the support area to the second end region of the support area,
    whereby
    the tension element connects the first end region of the support area to the second end region of the support area thereby transmitting tensile forces, and
    the pressure element is in the extension direction non-displaceably connected to the tension element as well in the first end region of the support area as in the second end region of the support area,
    the pressure element between the first end region and the second end region is arranged at a distance from the tension element and can take thrust forces,
    between the end regions the tension element and the pressure element are connected to one another by means of spacers, which spacers keep the distance between the pressure element and the tension element and allow a relative movement between the tension element and the pressure element in the extension direction of the structure, and
    the spacers together with the tension element and the pressure element in a cross section in the extension direction form a polygon structure, said structure having angles that are deformed by loading.

2. The backrest according to claim 1, characterized in that the spacers can be tilted relative to the tension element and the pressure element.

3. The backrest according to claim 1, characterized in that the mounting element is connected to at least one of the tension element and the pressure element in such a manner that this connection permits displacement of the tension element relative to the pressure element in the region of the mounting element.

4. The backrest according to claim 1, characterized in that the tension element and the pressure element are kept at a greater distance from one another in a central region than bordering on the two end regions.

5. The backrest according to claim 1, characterized in that the tension element and the pressure element—in the region of the mounting element are connected more stiffly and between the end regions and the mounting element are connected less stiffly.

6. The backrest according to claim 1, characterized in that the tension element and the pressure element are part of a flexible plastic profile, which plastic profile has a plurality of channels horizontally arranged in the backrest, whose cross sections when loaded deform individually with simultaneous deformation of adjacent channels, while parallel elements of the cross section remain parallel.

7. The backrest according to claim 1, characterized in that the support area is mounted around a horizontal axis below the vertical centre and above the lower, second end region.

8. The backrest according to claim 1, characterized in that reinforcement strips are connected to the pressure element, the tension element and the spacers aligned perpendicularly to the extension direction.

9. The backrest according to claim 8, characterized in that the reinforcement strips are flat plastic strips, which are inserted in guides, that are present in lamellas separating the chambers.

10. The backrest according to claim 8, characterized in that the reinforcement strips form a rear lining of the seat-back movable around the neutral axes.

11. The backrest according to claim 10, characterized in that the lining is attached to the pressure element by means of flexible tongues which engage into corresponding grooves in the pressure element.

12. The backrest according to claim 1, characterized in that the structure is formed in a central region only, and regions of the support area lying laterally near this central region are supported by means of reinforcement strips running parallel to the neutral axes.

13. The backrest according to claim 12, characterized in that several reinforcement strips are fixed to the spacers.

14. The backrest according to claim 12, characterized in that several reinforcement strips are fixed to the pressure element.

15. The backrest according to claim 12, characterized in that several reinforcement strips at their outside ends are connected to at least one of the support area and a frame around the support area.

16. The backrest according to claim 15, characterized in that several reinforcement strips are embedded in upholstered padding.

17. The backrest according to claim 1, characterized in that structures which are distinguishable from one another are present in at least two places of the backrest at a distance from one another, whereby each of these structures comprises a tension element, a pressure element and spacers.

18. The backrest according to claim 17, characterized in that the spacers of these distinguishable structures are connected to one another.

19. The backrest according to claim 17, characterized in that the neutral axes of the one structure deviate from a parallel to the neutral axes of the second structure.

20. The backrest according to claim 19, characterized in that the neutral axes in a cross section crosswise to the extension direction stand at an angle other than 0 and 180 degrees to one another.

21. The backrest according to claim 19, characterized in that the neutral axes in a line parallel to the support area stand at an angle other than 0 and 180 degrees to one another.

22. The backrest according to claim 19, characterized in that the neutral axes stand at an angle other than 90 degrees to the extension direction.

23. The backrest according to claim 1, characterized in that the tension element and the pressure element enclose a leak-proof space and are equipped with an inlet for a medium.

24. The backrest according to claim 1, characterized in that the spacers only offer resistance to tensile force.

25. The backrest according claim 1, characterized in that the spacers are formed by a honeycombed profile having channels with a honeycombed cross section.

26. The backrest according to claim 1, characterized in that the spacers are formed by elongated lamellas joined to the tension element and the pressure element.

27. The backrest according to claim 26, characterized in that the lamellas are arranged in staggered rows.

28. The backrest according to claim 1, characterized in that the spacers are sidewalls of a profile with a quadrangular cross section.

29. The backrest according to claim 28, characterized in that the tension element and the pressure element are constructed from a plurality of quadrangular profiles, which are lined up side by side and flexibly connected to one another.

30. The backrest according to claim 1, characterized in that the spacers are pin-shaped.

31. The backrest according to claim 30, characterized in that the spacers are connected with ball and socket joints to the tension element and the pressure element.

32. The backrest according to claim 1, characterized in that the spacers are formed by elements, which extend along a plane curve.

33. The backrest according to claim 1, characterized in that the spacers are formed by elements, which extend along a dimensionally inclined curve.

34. The backrest according to claim 1, wherein a transverse structure expands crosswise to the extension direction into the width of the backrest which transverse structure can be deformed around neutral axes crosswise to the expansion direction, on the front has a tension element, on the rear a pressure element, which are non-displaceably connected at two places, and between them are in the expansion direction displaceably connected to one another with spacer means.

35. The backrest according to claim 34, characterized in that the tension elements of the expanding transverse structures and the structures extending crosswise thereto form a unit.

36. The backrest according to claim 34, characterized in that the pressure elements of the expanding structures and of the structures extending crosswise thereto form a unit.

37. The backrest according to claim 34, characterized in that at least one of the tension elements, and pressure elements form a frame bordering the support area.

38. The backrest according to claim 37, characterized in that the spacers, the pressure element and the tension element are in a first direction non-displaceably connected and are in a second direction lying crosswise thereto displaceably connected to one another.

39. Any one of a chair and vehicle seat with a backrest according to claim 1.

40. Any one of a chair and vehicle seat according to claim 39, characterized in that the backrest exhibits a plastic profile with a plurality of chambers, which are horizontally arranged extending into the backrest, whereby the backrest with the at least one mounting element is mounted around a horizontal axis below the vertical centre of the backrest, however at a distance from the lower end of the backrest.

41. Any one of a chair and Chair or vehicle seat according to claim 40, characterized in that the reinforcement strips are flat plastic strips, which are arranged lying horizontally in corresponding guides provided in the chambers.

42. Any one of a chair and vehicle seat according to claim 39, characterized in that substantially horizontally arranged reinforcement strips are provided.

43. Any one of a chair and vehicle seat according to claim 39, characterized by a rear lining of the seat-back constructed from plastic lamellas, movable in itself around a plurality of horizontally tilting axes, which is attached to the structure by means of rubber tongues engaging into corresponding slots.

44. Any one of a chair and vehicle seat according to claim 39, characterized in that the backrest or the structure extending towards the top of the backrest is made pivotable around the bearing axis against a bias action.

45. The backrest according to claim 1, characterized in that the spacers together with the tension element and the pressure element in a cross section in the extension direction form a quadrangular structure with which the angles deform into a parallelogram by loading.

46. The backrest according to claim 1, characterized in that the support area is mounted around two axes inclined to one another below their vertical centre and above the lower, second end region.

* * * * *